United States Patent
Fritzler (10) Patent No.: US 11,457,521 B2
(45) Date of Patent: Sep. 27, 2022

(54) INFLUENCING A FOCAL SPOT (71) Applicant: Siemens Healthcare GmbH, Erlangen (DE)

(72) Inventor: Anja Fritzler, Erlangen (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 0 days.

(21) Appl. No.: 17/330,600

(22) Filed: May 26, 2021

(65) Prior Publication Data

US 2021/0385930 A1    Dec. 9, 2021

(30) Foreign Application Priority Data

Jun. 3, 2020 (DE) .................. 10 2020 206 938.7

(51) Int. Cl.
- *H05G 1/52* (2006.01)
- *H05G 1/56* (2006.01)
- *H05G 1/30* (2006.01)

(52) U.S. Cl.
CPC ............... *H05G 1/52* (2013.01); *H05G 1/56* (2013.01); *H05G 1/30* (2013.01)

(58) Field of Classification Search
CPC .................................... H05G 1/52; H05G 1/56
See application file for complete search history.

(56) References Cited

U.S. PATENT DOCUMENTS

| 6,252,935 | B1 | 6/2001 | Styrnol et al. |
| 2005/0094762 | A1* | 5/2005 | Dunham ............... A61B 6/4021 378/19 |
| 2010/0310051 | A1* | 12/2010 | Tsujii .................... H01J 35/065 378/138 |
| 2011/0122992 | A1 | 5/2011 | Hanke et al. |

(Continued)

FOREIGN PATENT DOCUMENTS

| CN | 102099888 A | 6/2011 |
| CN | 102498540 A | 6/2012 |

(Continued)

OTHER PUBLICATIONS

German Office Action dated Mar. 30, 2021.

(Continued)

*Primary Examiner* — Chih-Cheng Kao (74) *Attorney, Agent, or Firm* — Harness, Dickey & Pierce, P.L.C.

(57) ABSTRACT

A method is for spatially influencing a focal spot of an X-ray source that generates X-ray radiation, to an associated X-ray source, to an associated system and to an associated computer program product. The method according to at least one embodiment includes: producing a focal spot on an anode by way of an electron emitter including a plurality of emitter segments, individually controllable to emit electrons; determining at least one actual value of a spatial extent and/or of a position of the produced focal spot; comparing the at least one actual value with a specified reference value of the focal spot; and controlling the emitter segments based upon the (Continued)

comparison of the at least one actual value and the reference value such that the at least one actual value converges toward the reference value, thereby spatially influencing the focal spot of the X-ray source that generates X-ray radiation.

19 Claims, 2 Drawing Sheets

(56) References Cited

U.S. PATENT DOCUMENTS

| | | |
|---|---|---|
| 2011/0255667 A1 | 10/2011 | Lemaitre |
| 2012/0300901 A1 | 11/2012 | Lewalter et al. |
| 2021/0383997 A1 | 12/2021 | Fritzler |

FOREIGN PATENT DOCUMENTS

| | | |
|---|---|---|
| CN | 111031917 A | 4/2020 |
| DE | 19832972 A1 | 1/2000 |
| DE | 102012209089 A1 | 12/2013 |
| EP | 3528274 A1 | 8/2019 |
| WO | WO 2019149482 A1 | 8/2019 |

OTHER PUBLICATIONS

German Office Action and English translation thereof dated Mar. 30, 2021.

German Decision to Grant and English translation thereof dated Dec. 20, 2021.

\* cited by examiner

INFLUENCING A FOCAL SPOT

PRIORITY STATEMENT

The present application hereby claims priority under 35 U.S.C. § 119 to German patent application number DE 102020206938.7 filed Jun. 3, 2020, the entire contents of which are hereby incorporated herein by reference.

FIELD

Example embodiments of the invention generally relate to a method for spatially influencing a focal spot of an X-ray source that generates X-ray radiation, to an associated X-ray source, to an associated system and to an associated computer program product.

BACKGROUND

A conventional X-ray source is typically subject to internal and/or external interactions that can move a focal spot and X-ray radiation generated therein. The interactions can have thermal and/or mechanical causes.

SUMMARY

The inventors have discovered that movement of the produced focal spot or of the generated X-ray radiation is typically unintentional, but, depending on a reconstruction by an imaging protocol, is visible directly in the reconstructed image, for instance as image shake. Alternatively or additionally, the inventors have discovered that the unintentional movement can lead to smearing of the focal spot. The inventors have discovered that an image quality typically decreases as a result of the internal and/or external interactions.

At least one embodiment of the invention defines a method for spatially influencing a focal spot of an X-ray source that generates X-ray radiation, and/or defines an associated X-ray source, an associated system and an associated computer program product, wherein the movement produced by internal and/or external interactions is counteracted.

Advantageous embodiments are described in the claims.

The method according to at least one embodiment of the invention for spatially influencing a focal spot of an X-ray source that generates X-ray radiation comprises:

producing a focal spot on an anode by way of an electron emitter, wherein the electron emitter has a plurality of emitter segments that can be controlled individually to emit electrons;

determining at least one actual value of a spatial extent and/or of a position of the produced focal spot;

comparing the at least one actual value with a specified reference value of the focal spot;

controlling the emitter segments based upon the comparison of the at least one actual value and the reference value in such a way that the at least one actual value converges toward the reference value, thereby spatially influencing the focal spot of the X-ray source that generates X-ray radiation.

The X-ray source according to at least one embodiment of the invention has the electron emitter and the anode. The X-ray source can be a stationary anode X-ray source, a rotating envelope X-ray source or a rotating anode X-ray source. The X-ray source typically has an X-ray source housing, in which an evacuated X-ray tube housing is arranged. The X-ray source housing can have a stationary X-ray source output window and/or a liquid or gaseous cooling agent. The X-ray source is preferably designed for clinical or production imaging. Clinical imaging in particular comprises medical imaging. Production imaging in particular comprises materials testing.

The system according to at least one embodiment of the invention has the X-ray source and the artificial neural network. The artificial neural network may be part of the X-ray source.

The computer program product according to at least one embodiment of the invention may be a computer program or comprise a computer program. The computer program product in particular has the program code segments that models the method steps according to at least one embodiment of the invention. It is thereby possible to define and repeatedly perform the method according to at least one embodiment of the invention and to exercise control over disseminating the method according to at least one embodiment of the invention.

The computer program product is preferably configured such that the control unit can use the computer program product to perform the method steps according to at least one embodiment of the invention. The program code segments can be loaded in particular into a memory of the control unit, and typically can be executed by a processor of the control unit with access to the memory. When the computer program product, in particular the program code segments, is executed in the control unit, typically all the embodiments according to at least one embodiment of the invention of the described method can be implemented.

The computer program product is stored, for example in at least one embodiment, on a physical, computer-readable medium and/or digitally as a data packet in a computer network. The computer program product can constitute the physical, computer-readable medium and/or the data packet in the computer network. Hence at least one embodiment of the invention can also proceed from the physical computer-readable medium and/or from the data packet in the computer network. The physical, computer-readable medium can usually be connected directly to the control unit, for instance by inserting the physical, computer-readable medium into a DVD drive or by plugging same into a USB port, whereby the control unit can have access, in particular read access, to the physical, computer-readable medium. The data packet can preferably be retrieved from the computer network. The computer network can have the control unit or be connected directly to the control unit via a wide area network (WAN) connection and/or via a (wireless) local area network (WLAN or LAN) connection. For instance, the computer program product may be held digitally on a Cloud server at a storage location of the computer network, and be transferred via the WAN via the Internet and/or via the WLAN or LAN to the control unit, in particular by opening a download link that points to the storage location of the computer program product.

An X-ray source, for example in at least one embodiment, comprises:

an electron emitter; and an anode;

wherein the X-ray source is designed to implement at least the following producing a focal spot on the anode via the electron emitter, wherein the electron emitter has a plurality of emitter segments, individually controllable to emit electrons;

determining at least one actual value of at least one of a spatial extent and a position of the focal spot produced;

comparing the least one actual value with a reference value of at least one of the spatial extent and the position of the focal spot; and controlling the emitter segments based upon the comparing of the at least one actual value and the reference value such that the at least one actual value converges toward the reference value, to spatially influence the focal spot of the X-ray source that generates X-ray radiation.

A non-transitory computer program product, for example in at least one embodiment, is directly loadable into a memory of a controller, storing program code segments to perform the method of an embodiment when the computer program product is executed in the controller.

A non-transitory computer readable medium, for example in at least one embodiment, stores program code segments to perform the method of an embodiment when the program code segments are executed by at least one processor.

BRIEF DESCRIPTION OF THE DRAWINGS

The invention is described and explained in greater detail below with reference to the example embodiments shown in the figures, where the same reference signs are used in the following description of the figures to denote structures and units that remain substantially the same as in the first appearance of the structure or unit concerned, in which.

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. At least one embodiment of the present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (procesor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The method according to at least one embodiment of the invention for spatially influencing a focal spot of an X-ray source that generates X-ray radiation comprises:

producing a focal spot on an anode by way of an electron emitter, wherein the electron emitter has a plurality of emitter segments that can be controlled individually to emit electrons;

determining at least one actual value of a spatial extent and/or of a position of the produced focal spot;

comparing the at least one actual value with a specified reference value of the focal spot;

controlling the emitter segments based upon the comparison of the at least one actual value and the reference value in such a way that the at least one actual value converges toward the reference value, thereby spatially influencing the focal spot of the X-ray source that generates X-ray radiation.

The method is advantageous in particular because the convergence of the at least one actual value toward the reference value can compensate at least partially for an unintentional movement caused in particular by internal and/or external interactions. The convergence is advantageously facilitated by controlling the emitter segments of the electron emitter. Typically, the smaller a difference between the at least one actual value and the specified reference value, the better an image quality.

The X-ray source according to at least one embodiment of the invention has the electron emitter and the anode. The X-ray source can be a stationary anode X-ray source, a rotating envelope X-ray source or a rotating anode X-ray source. The X-ray source typically has an X-ray source housing, in which an evacuated X-ray tube housing is arranged. The X-ray source housing can have a stationary X-ray source output window and/or a liquid or gaseous cooling agent. The X-ray source is preferably designed for clinical or production imaging. Clinical imaging in particular comprises medical imaging. Production imaging in particular comprises materials testing.

The evacuated X-ray tube housing in particular comprises the anode, the electron emitter and/or an interior space preferably having a high vacuum. Inside the evacuated X-ray tube housing, the emitted electrons are typically accelerated from the electron emitter toward the anode. A typical acceleration voltage lies in the range between 40 and 150 kV. The X-ray tube housing typically features metal and/or glass.

The anode is typically rotationally symmetric relative to a rotational axis of the rotating envelope X-ray source or of the rotating anode X-ray source. In particular, the anode features tungsten, gold and/or molybdenum. The anode can generally be connected to a heatsink. For instance, the heatsink can be embodied as part of the X-ray tube housing. The heatsink can form a rear side of the anode, whereas the electrons are incident on a front side of the anode. The heatsink can be cooled, for instance, by the cooling agent of the X-ray source housing. For example, the heatsink can be cooled by heat exchange taking place on a surface of the heatsink, in particular as a result of the rotation of the X-ray source housing.

The focal spot is produced typically according to the specified reference value. The reference value in particular defines the spatial extent and/or the position of the focal spot. The spatial extent comprises in particular a shape and/or a dimension of this shape. The shape may be a circle, a quadrilateral and/or a polygon. Alternatively or additionally, the shape may comprise semicircular and/or straight segments. The dimension of this shape comprises in particular a circumference, an area, an edge length and/or a diameter. The position of the focal spot in particular describes a center point and/or edge point of the spatial extent, and/or a center of mass of a distribution of the electrons in the focal spot.

The electrons are incident on the anode typically while the X-ray source is operating. The production of the focal spot comprises in particular that the electrons are incident on the anode in the focal spot. The incident electrons typically interact with the anode such that the X-ray radiation is generated. The X-ray radiation is typically generated in the produced focal spot. For the embodiment as a rotating envelope X-ray source or rotating anode X-ray source, the focal spot is typically part of a rotationally symmetric focal track on the anode and/or is off-center relative to the rotational axis. Off-center means in particular being located away from the reference point, for instance the rotational axis, by a radius or distance of greater than 0. The focal spot typically varies over time and/or varies spatially with respect to the focal track, which is rotational during operation. For example, the anode is mounted inside the X-ray tube housing using a fastening device, in particular a bolt and/or a solder point, for the embodiment as a rotating envelope X-ray source, or via a rotational bearing for the embodiment as a rotating anode X-ray source. In the case of the embodiment as a rotating envelope X-ray source, the anode typically co-rotates with the X-ray tube housing. In this case, the anode and the X-ray tube housing in particular are structurally fixedly connected to each other to form a unit.

The electron emitter can be arranged centrally, for instance on the rotational axis, in which case a deflection unit is preferably used to direct and/or focus the emitted electrons onto the focal spot. Alternatively, the electron emitter is arranged in particular with respect to the focal spot in such a way that the emitted electrons are incident in the focal spot preferably without a deflection unit. The electron emitter can be mounted inside the X-ray tube housing substantially fixedly, in particular relative to the X-ray source housing, preferably for the embodiment as a stationary anode X-ray source and as a rotating anode X-ray source. For the embodiment as a rotating anode X-ray source, the electron emitter is mounted or arranged inside the X-ray tube housing relative to the rotational axis and/or to the X-ray source housing in such a way that the electron emitter does not co-rotate with the anode relative to the X-ray source housing during operation of the X-ray source. For example, a fixing unit counteracts the co-rotation with the anode.

The emitter segments can be arranged in particular adjacent to each other, in particular offset in the phi-, z- or r-direction with respect to a rotational axis. The electrons are emitted in particular by the plurality of emitter segments that can be controlled individually to emit electrons. The plurality of emitter segments comprises a plurality of emitter segments that can be controlled individually to emit electrons. The individual controllability of the emitter segments comprises in particular individually switching, for instance switching on or switching off, at least one emitter segment of the plurality of emitter segments, for example by the control unit in particular based upon the comparison of the at least one actual value and the reference value, in such a way that the at least one actual value converges toward the reference value. The switching on can be performed gradually in order to control an intensity of the electron current.

The electron emitter is typically designed such that the electrons are emitted according to the specified reference value in anticipation of the spatial extent and/or the position of the focal spot. This means in particular that the electrons are preferably emitted in a focused and/or directional manner according to the specified reference value. Thus in this case there is advantageously no deflection or focusing unit provided for this purpose in the X-ray source. Alternatively or additionally, a deflection or focusing unit can be provided for this purpose in the X-ray source such that the electrons are incident on the anode as specified for the focal spot by the reference value.

During operation of the X-ray source, the X-ray tube housing of the rotating envelope X-ray source typically rotates while in particular the X-ray source housing is stationary and the electron emitter is substantially stationary. Alternatively or additionally, the anode, for example, rotates during operation of the X-ray source. The rotation is a form of interaction that can have a negative influence on the at least one actual value of the spatial extent and/or of the position of the focal spot. For example, a structurally and/or mechanically induced movement that acts on the anode and/or on the electron emitter has an influence on the at least one actual value. The influence on the at least one actual value typically results in the focal spot moving and/or a difference between the specified reference value and the at least one actual value becoming larger or smaller. The structurally and/or mechanically induced movement may be shaking, vibration and/or an inertial movement, and/or typically occurs during operation of the X-ray source. The influence on the at least one actual value, which influence arises during operation of the X-ray source, is usually unintentional. The spatial influencing of the focal spot is based in particular on the movement of the electron emitter because the focal spot typically depends directly on the emitted electrons. The X-ray radiation, in particular the quality of the X-ray radiation, typically depends directly on the spatial extent and/or the position of the focal spot. The spatial movement of the focal spot and/or of the electron emitter and/or of the anode is possible in particular in all spatial directions. The structurally and/or mechanically induced movement of the electron emitter and/or of the anode during operation of the X-ray source is typically transferred to the focal spot.

The determining comprises in particular detecting at least one actual value of the spatial extent and/or of the position of the produced focal spot. The at least one determined actual value in particular describes the instantaneous spatial extent and/or the instantaneous position of the focal spot. Determining the at least one actual value comprises in particular modeling and/or calculating the spatial extent and/or the position of the produced focal spot. The determining is performed in particular in a control unit of the X-ray source. The at least one actual value can preferably be determined at a determination frequency that is greater than a rotational frequency of the rotating envelope X-ray source or of the rotating anode X-ray source. The determination frequency can be lower than the rotational frequency. The determination frequency is higher than the rotational frequency preferably by a factor of 10, advantageously by a factor of 100, particularly advantageously by a factor of 1000. The determination frequency is preferably greater than 1 Hz, advantageously greater than 10 Hz, particularly advantageously greater than 100 Hz.

The comparison is typically performed in the control unit of the X-ray source. In particular, a comparison result is determined in the comparison, with the emitter segments being controlled based upon the comparison results. Particularly advantageously, the at least one actual value equals the specified reference value during operation of the X-ray source. In this case, no further convergence of the at least one actual value toward the reference value is needed. Thus typically the focal spot is not spatially influenced. When a difference between the at least one actual value and the specified reference value is greater than zero, the emitter segments are controlled in such a way that the at least one actual value converges toward the reference value. In particular, the control unit is designed to control the emitter segments. The individual controllability of the emitter segments advantageously makes it possible to influence, preferably reduce, the spatial movement of the focal spot, which movement is based on the movement of the electron emitter and/or of the anode, by the convergence of the at least one actual value toward the actual value. The electron emission from the emitter segments can preferably be controlled in such a way as to influence the spatial movement of the focal spot, which movement is based on the movement, in particular on the shaking, vibration and/or inertial movement, of the electron emitter and/or of the anode. The electron emission can be controlled in particular in such a way that the electrons are emitted counter to the movement, in particular counter to the shaking, vibration and/or inertial movement. In particular, the plurality of emitter segments that can be controlled individually to emit electrons are designed such that the electrons are emitted counter to the movement, in particular counter to the shaking, vibration and/or inertial movement of the electron emitter and/or of the anode. The spatial influencing comprises altering, in particular increasing and preferably decreasing. The decreasing corresponds in particular to at least partially compensating. The influencing of the focal spot preferably stabilizes the focal spot.

According to one embodiment, during control of the emitter segments at least one emitter segment is switched on or switched off. The individual switching comprises in particular switching on or switching off the at least one emitter segment of the plurality of emitter segments at a time at which another emitter segment of the plurality of emitter segments is on. The individual switching comprises alternatively or additionally in particular switching on or switching off the other emitter segment of the plurality of emitter segments at another time, at which the at least one emitter segment of the plurality of emitter segments is on. A switching frequency of the emitter segments is preferably higher than the rotational frequency.

According to one embodiment, an imaging protocol that specifies the reference value is provided before the focal spot is produced. The reference value typically is part of an imaging protocol or is specified by at least one imaging parameter of the imaging protocol. The reference value in the imaging protocol may differ from a reference value in another imaging protocol. The imaging protocol can differ from the other imaging protocol in terms of a volume of interest, a dynamic behavior and/or an X-ray dose. The imaging protocol typically has a tube current, which correlates to an electron rate in the focal spot. The tube current may vary over time and/or vary from a specified or maximum X-ray dose, in particular depending on a patient. For example, the reference value can depend on the tube current, in particular on an intensity of the tube current.

According to one embodiment, electrons are emitted during the control of the emitter segments, and X-ray radiation is generated in the focal spot based upon the electrons, wherein at least one attenuation profile is detected via the X-ray radiation, and wherein an image is reconstructed using the at least one attenuation profile. In principle it is conceivable that the at least one attenuation profile is emitted via the X-ray radiation generated before the determination of the focal spot, and via the X-ray radiation generated after the control of the emitter segments. Depending on the comparison result, an attenuation profile detected before the determination of the at least one actual value can be discarded. The image advantageously has a higher quality than another image, which is conventionally reconstructed and for which the focal spot is not spatially influenced.

According to one embodiment, after the comparison, an edge of an artificial neural network and/or a weight of the edge of the artificial neural network is adapted based upon the comparison of the at least one actual value and the reference value. It is thereby advantageously possible to at least partially reduce, in particular prevent, a future divergence of a further actual value from the updated reference value. For example, the artificial neural network can control the emitter segments based upon the comparison of the at least one actual value and the reference value in such a way that the at least one actual value converges toward the reference value. The artificial neural network typically has an input layer with input nodes, an output layer with output nodes, and an intermediate layer comprising intermediate nodes, wherein the output layer is connected to the input layer via the intermediate layer. The connection can be made, for example, via weighted edges between the input nodes, the output nodes and the intermediate nodes. Usually the nodes are not all interconnected to one another. The artificial neural network may be in particular a recursive artificial neural network that is preferably designed for continuous learning.

According to one embodiment, the at least one actual value is determined via a sensor unit. The sensor unit may be, for example, a camera, in particular a thermal imaging camera, and/or a laser apparatus. Alternatively or additionally, the sensor unit can comprise a sensor window that is arranged in the beam path of the electrons or in the beam path of the X-ray radiation. The sensor window preferably has a low absorption for the electrons or X-ray radiation. The sensor window is preferably substantially transparent to the electrons or the X-ray radiation. The sensor window can comprise glass, plastic or a textile. The sensor window can comprise an electron detector and/or an X-ray radiation detector. The sensor unit is connected in particular to the control unit for transferring the at least one actual value. The sensor unit may be part of the X-ray source.

According to one embodiment, determining the at least one actual value comprises detecting the generated X-ray radiation and converting the detected, generated X-ray radiation into the at least one actual value. This embodiment is advantageous in particular if the divergence of the at least one actual value from the specified reference value arises during the generation of the X-ray radiation in the focal spot, for example as a result of the anode being damaged and/or having an irregularity.

According to one embodiment, the electron emitter is a field-effect emitter. The field-effect emitter in particular is a segmented field-effect emitter that has the plurality of emitter segments that can be controlled individually to emit electrons. The field-effect emitter is typically based on silicon or carbon. The field-effect emitter typically has a plurality of field-effect emitter pins for emitting the electrons. In principle it is conceivable that each segment of the segmented field-effect emitter has just one single field-effect emitter pin. Typically, the first segment and/or the second segment of the segmented field-effect emitter has at least that number of field-effect emitter pins that allows the X-ray source to operate at an electron current density of greater than or equal to 0.1 A/cm^2, preferably greater than or equal to 1 A/cm^2, particularly advantageously greater than or equal to 10 A/cm^2 over an operating period of at least 1 h, preferably 100 h, particularly advantageously 10000 h. The segmented field-effect emitter can be a closed unit. The segmentation of the segmented field-effect emitter can be designed according to a Cartesian or a Polar coordinate system. The segmentation of the segmented field-effect emitter can be achieved by way of a physical, for instance an electrical irreversible, interconnection of the field-effect emitter or can be achieved or performed via a logical interconnection of the field-effect emitter, which interconnection can preferably be altered during the operating period of the field-effect emitter. The field-effect emitter can have, for example, two layers: a first layer with the field-effect emitter pins and a second layer with the physical or logical interconnection, which interconnection defines the segmentation. An extent and/or a number of field-effect emitter pins of the at least one segment can differ from an extent and/or a number of field-effect emitter pins of the other segment of the plurality of field-effect emitter segments. Alternatively, the electron emitter can be a flat emitter or a filament emitter or have a combination of the different emitter types.

According to one embodiment, at least some of the emitter segments are arranged in two mutually orthogonal directions. This embodiment is advantageous in particular because the spatial movement of the focal spot can be reduced as a result of the controllability of the electron emissions in more than one direction, for instance in two directions of the three directions phi, z, r with respect to the rotational axis. This embodiment is particularly advantageous in combination with the previous embodiment, in which the electron emitter is the segmented field-effect emitter.

The system according to at least one embodiment of the invention has the X-ray source and the artificial neural network. The artificial neural network may be part of the X-ray source.

The computer program product according to at least one embodiment of the invention may be a computer program or comprise a computer program. The computer program product in particular has the program code segments that models the method steps according to at least one embodiment of the invention. It is thereby possible to define and repeatedly perform the method according to at least one embodiment of the invention and to exercise control over disseminating the method according to at least one embodiment of the invention. The computer program product is preferably configured such that the control unit can use the computer program product to perform the method steps according to at least one embodiment of the invention. The program code segments can be loaded in particular into a memory of the control unit, and typically can be executed by a processor of the control unit with access to the memory. When the computer program product, in particular the program code segments, is executed in the control unit, typically all the embodiments according to at least one embodiment of the invention of the described method can be implemented. The computer program product is stored, for example, on a physical, computer-readable medium and/or digitally as a data packet in a computer network. The computer program product can constitute the physical, computer-readable medium and/or the data packet in the computer network. Hence at least one embodiment of the invention can also proceed from the physical computer-readable medium and/or from the data packet in the computer network. The physical, computer-readable medium can usually be connected directly to the control unit, for instance by inserting the physical, computer-readable medium into a DVD drive or by plugging same into a USB port, whereby the control unit can have access, in particular read access, to the physical, computer-readable medium. The data packet can preferably be retrieved from the computer network. The computer network can have the control unit or be connected directly to the control unit via a wide area network (WAN) connection and/or via a (wireless) local area network (WLAN or LAN) connection. For instance, the computer program product may be held digitally on a Cloud server at a storage location of the computer network, and be transferred via the WAN via the Internet and/or via the WLAN or LAN to the control unit, in particular by opening a download link that points to the storage location of the computer program product.

Features, advantages or alternative embodiments mentioned in the description of the device can also be applied to the method, and vice versa. In other words, claims relating to the method can be developed by features of the device, and vice versa. In particular, the device according to at least one embodiment of the invention can be used in the method.

Figure 1:
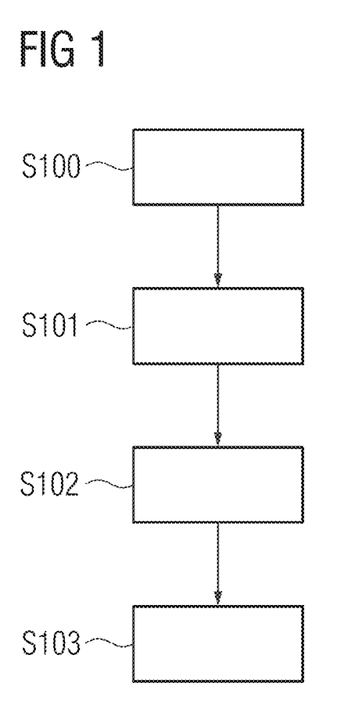
FIG. 1 shows a method for spatially influencing a focal spot of an X-ray source that generates X-ray radiation.

FIG. 1 shows in a flow diagram a method for spatially influencing a focal spot of an X-ray source that generates X-ray radiation.

Method step S100 denotes producing a focal spot on an anode via an electron emitter, wherein the electron emitter has a plurality of emitter segments that can be controlled individually to emit electrons.

Method step S101 denotes determining at least one actual value of a spatial extent and/or of a position of the produced focal spot.

Method step S102 denotes comparing the least one actual value with a specified reference value of the spatial extent and/or of the position of the focal spot.

Method step S103 denotes controlling the emitter segments based upon the comparison of the at least one actual value and the reference value in such a way that the at least one actual value converges toward the reference value, thereby spatially influencing the focal spot of the X-ray source that generates X-ray radiation.

Figure 2:
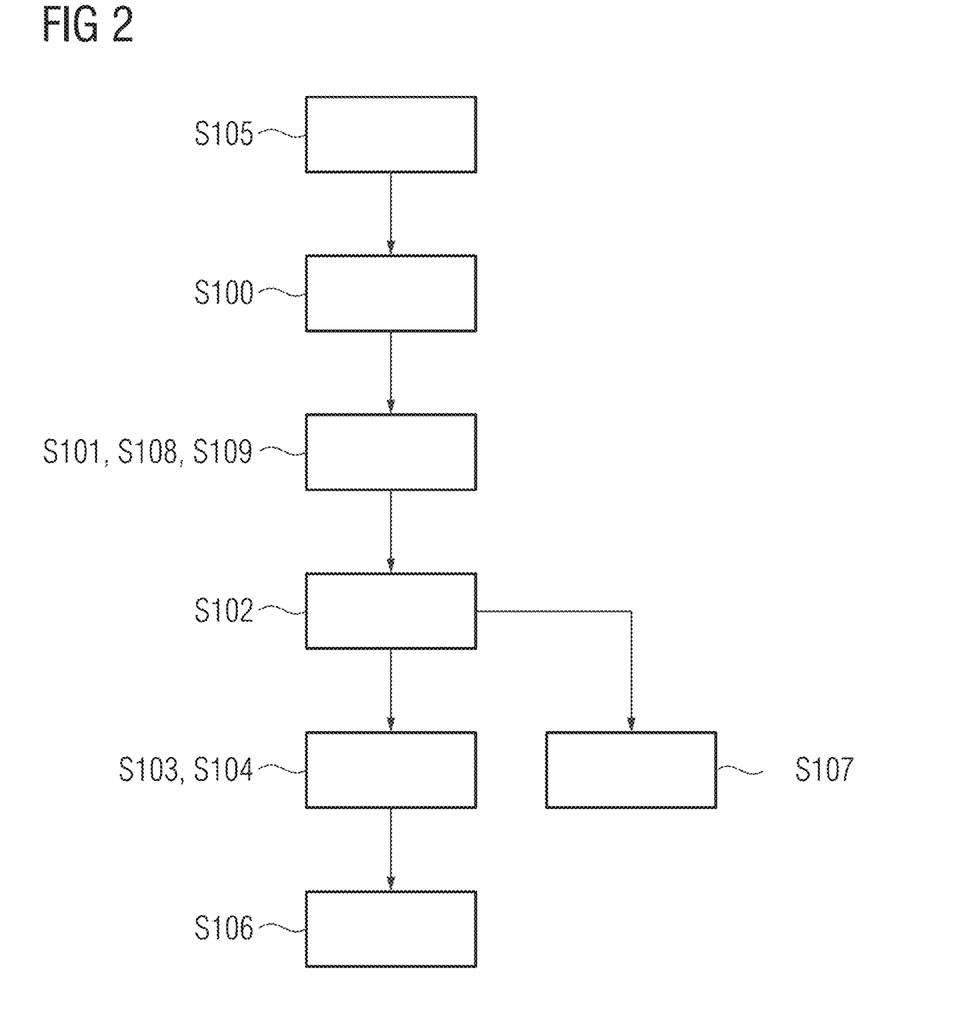
FIG. 2 shows the method according to the invention of FIG. 1 in another embodiment.

FIG. 2 shows the method according to the invention of FIG. 1 in another embodiment:

Method step S104 denotes that during the control, at least one emitter segment is switched on or switched off.

Method step S105 denotes that an imaging protocol that specifies the reference value is provided before the focal spot is produced.

Method step S106 denotes that electrons are emitted during the control of the emitter segments, and X-ray radiation is generated in the focal spot based upon the electrons, wherein at least one attenuation profile is detected by way of the X-ray radiation, and wherein an image is reconstructed using the at least one attenuation profile.

Method step S107 denotes that after the comparison, an edge of an artificial neural network and/or a weight of the edge of the artificial neural network is adapted based upon the comparison of the at least one actual value and the reference value.

Method step S108 denotes that the at least one actual value is determined via a sensor unit.

Method step S109 denotes that determining the at least one actual value comprises detecting the generated X-ray radiation and converting the detected, generated X-ray radiation into the at least one actual value.

Although the invention has been illustrated and described in detail using the preferred example embodiments, the invention is not limited by the disclosed examples, and a person skilled in the art can derive other variations therefrom that are still covered by the scope of protection of the invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for spatially influencing a focal spot of an X-ray source that generates X-ray radiation, the method comprising:
producing a focal spot on an anode via an electron emitter, wherein the electron emitter has a plurality of emitter segments, individually controllable to emit electrons;
determining at least one actual value of at least one of a spatial extent and a position of the focal spot produced;
comparing the least one actual value with a reference value of at least one of the spatial extent and the position of the focal spot; and
controlling the emitter segments based upon the comparing of the at least one actual value and the reference value such that the at least one actual value converges toward the reference value, to spatially influence the focal spot of the X-ray source that generates X-ray radiation.

2. The method of claim 1, wherein during the controlling, at least one emitter segment is switched on or switched off.

3. The method of claim 2, wherein electrons are emitted during the controlling of the emitter segments, and X-ray radiation is generated in the focal spot based upon the electrons, wherein at least one attenuation profile is detected by way of the X-ray radiation, and wherein an image is reconstructed using the at least one attenuation profile.

4. The method of claim 2, wherein after the comparison, at least one of an edge of an artificial neural network and a weight of the edge of the artificial neural network is adapted based upon the comparing of the at least one actual value and the reference value.

5. The method of claim 2, wherein the at least one actual value is determined via a sensor.

6. The method of claim 1, wherein an imaging protocol that specifies the reference value is provided before the producing of the focal spot.

7. The method of claim 1, wherein electrons are emitted during the controlling of the emitter segments, and X-ray radiation is generated in the focal spot based upon the electrons, wherein at least one attenuation profile is detected by way of the X-ray radiation, and wherein an image is reconstructed using the at least one attenuation profile.

8. The method of claim 1, wherein after the comparison, at least one of an edge of an artificial neural network and a weight of the edge of the artificial neural network is adapted based upon the comparing of the at least one actual value and the reference value.

9. The method of claim 1, wherein the at least one actual value is determined via a sensor.

10. The method of claim 1, wherein the determining of the at least one actual value comprises detecting the generated X-ray radiation and converting the detected, generated X-ray radiation into the at least one actual value.

11. A non-transitory computer program product, directly loadable into a memory of a controller, storing program code segments to perform the method of claim 1 when the computer program product is executed in the controller.

12. An X-ray source comprising:
an electron emitter; and
an anode;
wherein the X-ray source is designed to implement at least the following
producing a focal spot on the anode via the electron emitter, wherein the electron emitter has a plurality of emitter segments, individually controllable to emit electrons;

determining at least one actual value of at least one of a spatial extent and a position of the focal spot produced;

comparing the least one actual value with a reference value of at least one of the spatial extent and the position of the focal spot; and controlling the emitter segments based upon the comparing of the at least one actual value and the reference value such that the at least one actual value converges toward the reference value, to spatially influence the focal spot of the X-ray source that generates X-ray radiation.

13. The X-ray source of claim 12, wherein the electron emitter is a field-effect emitter.

14. The X-ray source of claim 13, wherein at least some of the emitter segments are arranged in two mutually orthogonal directions.

15. The X-ray source of claim 13, further having a sensor unit.

16. A system comprising:
   the X-ray source of claim 13; and
   an artificial neural network.

17. The X-ray source of claim 12, wherein at least some of the emitter segments are arranged in two mutually orthogonal directions.

18. The X-ray source of claim 12, further having a sensor unit.

19. A system comprising:
   the X-ray source of claim 12; and
   an artificial neural network.

* * * * *